May 2, 1961 L. P. GARVEY 2,982,335
SEAT POSITIONING MECHANISM
Filed March 5, 1958 3 Sheets-Sheet 1

INVENTOR.
Louis P. Garvey
BY
W. S. Pettigrew
ATTORNEY

INVENTOR.
Louis P. Garvey
BY
W. S. Pettigrew
ATTORNEY

May 2, 1961 L. P. GARVEY 2,982,335
SEAT POSITIONING MECHANISM
Filed March 5, 1958 3 Sheets-Sheet 3

INVENTOR.
Louis P. Garvey
BY
W. S. Pettigrew
ATTORNEY

United States Patent Office 2,982,335
Patented May 2, 1961

2,982,335
SEAT POSITIONING MECHANISM

Louis P. Garvey, Birmingham, Mich., assignor to General Motors Corporation, Detroit, Mich., a corporation of Delaware Filed Mar. 5, 1958, Ser. No. 719,364

8 Claims. (Cl. 155—14)

This invention relates to seat positioning mechanisms and more particularly to vehicle seat positioning mechanisms of the dial selector type which facilitate exit and entrance of the driver and seat passengers and which allow a plurality of drivers to each dial an elected seat position best suited for his driving comfort.

The seat positioning mechanism of this invention is intended for use in vehicles having power operated seats adjustable in both horizontal and vertical directions. In the preferred embodiment of the invention, the horizontal and vertical power operating means of the front seat are responsive to opening and closing movement of the vehicle front doors whereby opening movement of either front door or both will cause the seat to be displaced from its initial starting or manually selected position to a horizontal rearward and a vertically downward predetermined limit position to facilitate exit and entrance of both the driver and front seat passengers. When the front door or doors are thereafter closed, the seat is returned to its initial starting or manually selected position.

In the usual power operated seat adjusting mechanism, a manually operable seat switch must be manipulated by the driver to adjust the seat to the combination horizontal and vertical seat position best suited for his driving comfort. However, it is impossible for the driver to arrive at the same desired seat position successively without manipulating the switch each time since there is no means provided for instantaneously indicating to the driver his originally selected position. Thus, if one driver initially moves the seat to his selected position and another driver then moves the seat to his selected position, and then the first driver desires to return the seat to his selected position, he can only do so through a number of adjustments of the seat accomplished by manipulation of the seat switch.

The manual control means of the subject seat positioning mechanism includes a suitably marked dial and a pair of control knobs, one for horizontal and the other for vertical seat adjustment. Each dial is marked according to increments of horizontal or vertical seat movement whereby once a driver obtains his desired combination of horizontal and vertical seat position, he merely has to remember the combination and thereafter set the knobs at this particular combination whenever he enters the vehicle or is seated within the vehicle.

The control circuit of the subject seat positioning mechanism is arranged whereby the driver can set the elected seat position prior to entering the vehicle, when a front door is open, and thereafter after he enters the vehicle and closes the front door, the seat will be moved to the set elected seat position, regardless of the fact that this may be a different position than the initial starting or manually selected seat position of the preceding driver.

The primary object of this invention is to provide an improved vehicle seat positioning mechanism for facilitating driver and seat passenger exit and entrance. Another object of this invention is to provide an improved seat positioning mechanism of the dial selector type which allows a plurality of drivers to each instantaneously set an elected seat position and moves the seat to this set position. A further object of this invention is to provide an improved seat positioning mechanism which allows a plurality of drivers to each set an elected seat position prior to entrance within the vehicle and which automatically moves the seat to the desired seat position upon entrance within the vehicle and closing of the front door thereof.

These and other objects of this invention will be readily apparent from the following specification and drawings, wherein.

Figure 1:
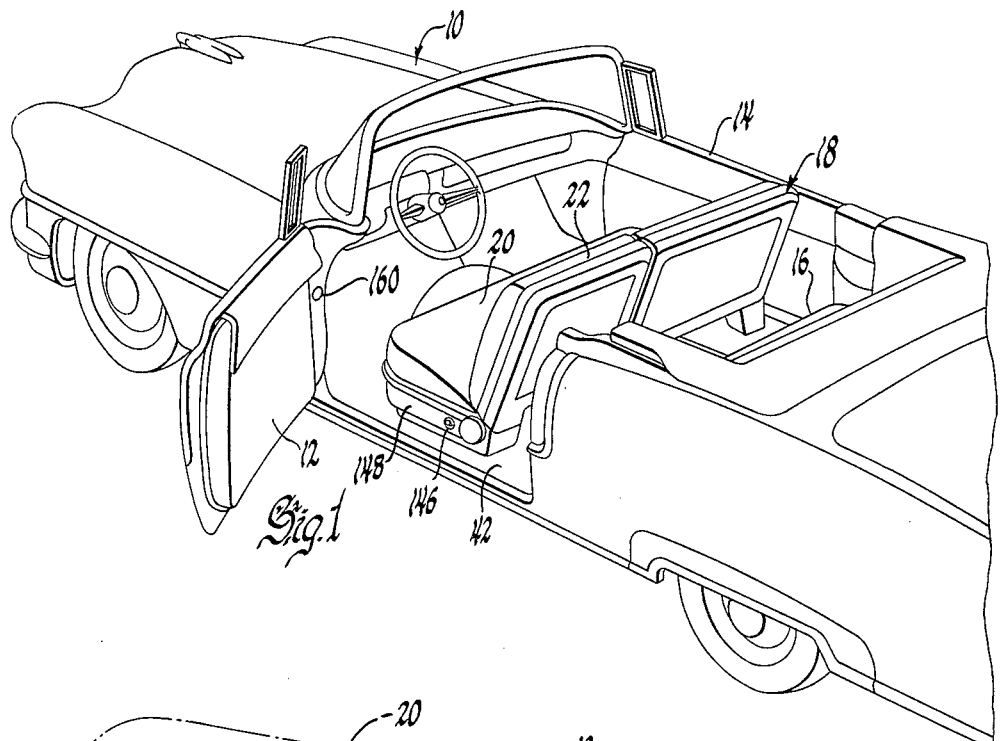
Figure 1 is a partial perspective view of a vehicle embodying a seat positioning mechanism according to one embodiment of this invention.
Figure 2:
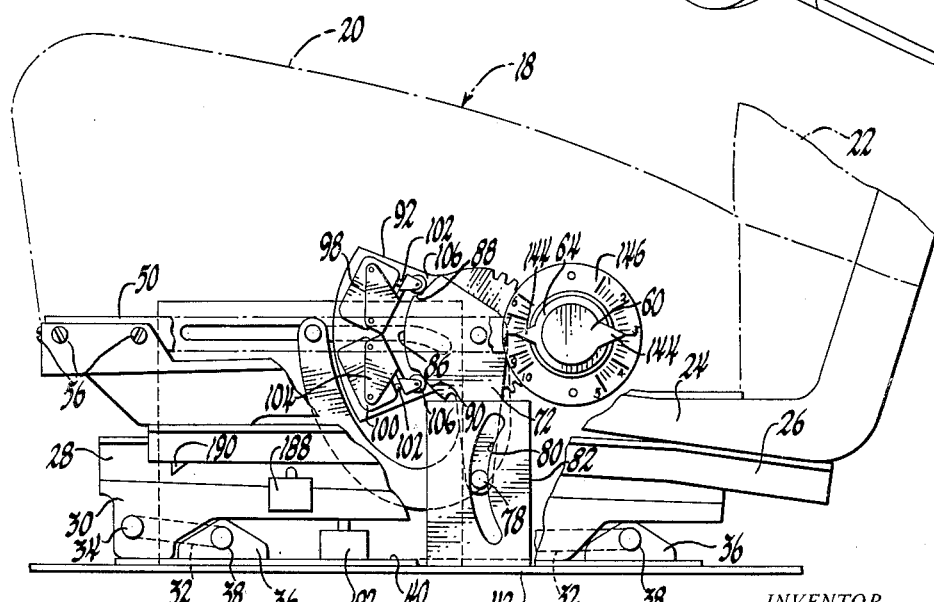
Figure 2 is a side elevational view of the front seat of the vehicle of Figure 1, with parts thereof broken away for clarity of illustration.

Referring now particularly to Figures 1 and 2 of the drawings, vehicle 10 includes left hand and right hand front doors 12 and 14, respectively, a rear seat 16, and a front seat 18 including a seat cushion 20 and a seat back 22 mounted within a seat frame 24. The seat adjusting mechanism is the same on either side of the seat and includes an upper track member 26 secured to frame 24 and slidably supported on a lower track member 28 by means of ball bearings or other suitable antifriction means. The lower track 28 is secured to a base support 30 which is supported at either end thereof by yokes 32 pivoted to the base at 34 and to brackets 36 at 38. Brackets 36 are secured to a support 40 which is fixed to the vehicle floor pan 42.

The upper and lower track members 26 and 28 provide horizontal seat adjustment, and the yokes 32 provide vertical seat adjustment. While any known type of power operating mechanism can be used, it is preferable that the mechanism employ electric motors for both horizontal and vertical seat adjustment. Application Serial No. 395,822, filed December 2, 1953, now Patent No. 2,809,689, Louis P. Garvey et al., and assigned to the assignee of this invention, shows a suitable power operating mechanism which employs electric motors for both horizontal and vertical seat adjustment. Since the power operating mechanism per se forms no part of this invention, reference may be had to the above application for a full and complete description of a suitable power operating mechanism employing electric motors.

Referring now particularly to Figures 2, 3, 5 and 6 of the drawings, the seat control unit will be described. A generally U-shaped bracket 50 having inboard and outboard legs 52 and 54, respectively, is fixedly secured at 56 to the seat frame 24. A vertical control shaft 58 extends between the legs 52 and 54 of bracket 50 and a vertical control knob 60 is fixedly secured to the outboard end of the shaft. The inboard end of the shaft is journaled in the inboard leg 52 of the bracket and the outboard end of the shaft is journaled within a hollow horizontal control shaft 62 which in turn is journaled within the outboard leg 54 of bracket 50. An apertured horizontal control knob 64 is fixedly secured to the outboard end of shaft 62. It can be seen that selective and independent adjustment of the shafts 58 and 62 may be had by means of the manually operated control knobs 60 and 64, respectively. A pinion 66 is fixedly secured to the shaft 58 and a similar pinion 68 is fixedly secured to the shaft 62.

A shaft 70 spaced forwardly of the shaft 58 is fixedly secured within the inboard and outboard legs 52 and 54 of the bracket 50. A lever arm 72 is rotatably mounted on the shaft 70 and a friction clutch arrangement between the arm and the shaft is provided by a pair of opposed Belleville spring washers 74 which are fixed to the shaft at 76 and frictionally engage the arm at either side thereof. The Belleville spring washers releasably hold the arm in any rotative position thereof relative to the shaft. One end of the lever arm 72 mounts a stud 78 which is slidable within an arcuate slot 80 of an angle bracket 82 bolted to the vehicle floor pan 42 at 84. The other end of the arm includes arcuate cams 86, 88, and 90 having their centers at the axis of the shaft 70, with cam 86 having a larger radius than cams 88 or 90. A sector plate 92 is rotatably mounted on the shaft 70 and the rotative position of the sector plate relative to the shaft is releasably fixed by a pair of opposed Belleville spring washers 94 which are fixedly secured to the shaft at 96 and frictionally engage opposite sides of the plate. The sector plate meshes with the pinion 68 whereby any rotational movement of the shaft 62 upon manual adjustment of the knob 64 will result in rotational movement of the sector plate relative to the shaft 70 and lever arm 72. The sector plate fixedly mounts a pair of like normally open horizontal limit switches 98 and 100, with switch 98 controlling horizontal forward movement of the seat and switch 100 controlling horizontal rearward movement of the seat as will be further described. Each of the switches is the same and is provided with a plunger 102, with inward movement of the plunger to close the switch being controlled by a spring arm 104 which engages the plunger and mounts a roller 106. In the initial starting or manually selected position of the seat, the roller 106 of switch 98 engages the cam 88 of the arm 72 and the roller 106 of the switch 100 engages the cam 90 of the arm 72 whereby both switches are normally open.

Another sector plate 108 is rotatably mounted on the shaft 70 adjacent the inboard end thereof, with the rotative position of the sector plate relative to the shaft being releasably fixed by a pair of opposing Belleville spring washers 110 which are fixed to shaft 70 at 112 and frictionally engage opposite sides of the sector plate 108. The sector plate meshes with the pinion 66 which is fixed to shaft 58 whereby rotational movement of the shaft 58 by means of the vertical control knob 60 will result in rotational movement of the sector plate 108 relative to the shaft 70. A lever arm 114 is rotatably mounted on shaft 70, inboard of plate 108, with the rotative position of the lever arm relative to the shaft being releasably fixed by a pair of opposing Belleville spring washers 116 which are fixed to shaft 70 at 118 and frictionally engage opposite sides of the lever arm. One leg of the lever arm mounts a pin 120 which is slidable within a slot 122 of angle bracket 124 bolted to the vehicle floor pan 42 at 126. The other leg of the lever arm fixedly mounts a pair of like normally open limit switches 128 and 130, with switch 128 controlling vertical upward movement of the seat and switch 130 controlling vertical downward movement of the seat. Each of the switches includes a plunger 132, with inward movement of the plunger to close the switch being controlled by a spring arm 134 mounting a roller 136. The rollers 136 normally engage cams 138 and 140, whereby the switches are normally open, with the cams being spaced by an intermediate cam 142, with all cams having their centers at the axis of the shaft 70.

Although Belleville spring washers are shown to provide a frictional clutch between shaft 70 and the sector plates 92 and 108 and between shaft 70 and lever arms 72 and 114, other frictional clutch arrangements may also be used, such as the commonly used window regulator friction clutch.

As best shown in Figure 2 of the drawings, the horizontal and vertical control knobs 64 and 60 are each provided with a pointer 144 with these pointers being movable over a dial 146 which is suitably fixed to the seat side panel 148 and is graduated on one side thereof with numerals 1 through 5 corresponding to 4 inches of vertical seat movement, and on the other side thereof with numerals 6 through 10 corresponding to 4 inches of horizontal seat movement.

Figure 4:
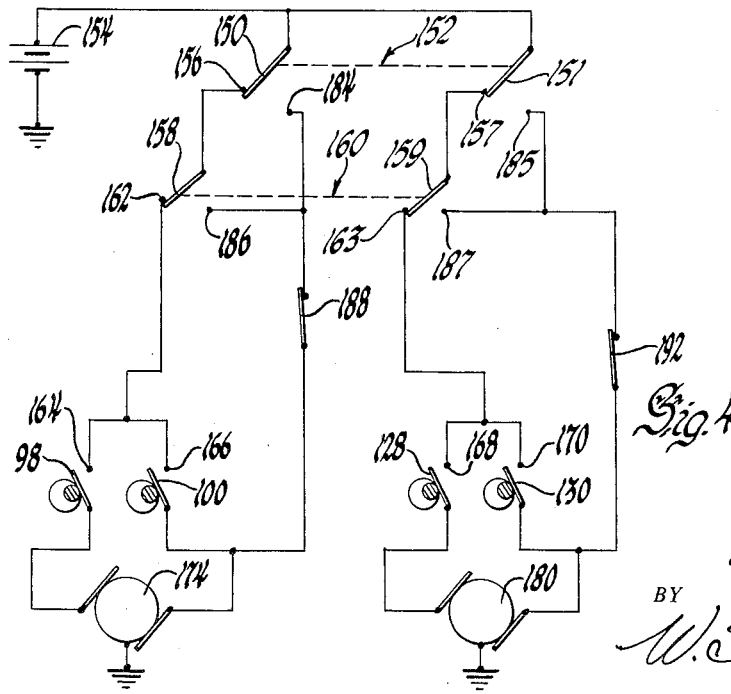
Figure 4 is a circuit diagram.

Referring now particularly to Figure 4 of the drawings, the gauged armatures 150 and 151 of a right hand front door jamb switch 152 are connected to one side of a battery 154 which is grounded. The armatures 150 and 151 are normally closed to contacts 156 and 157, respectively, when the right hand door is closed, with contacts 156 and 157 being respectively connected to the gauged armatures 158 and 159 of the left hand front door jamb switch 160. As best shown in Figure 1 of the drawings, switch 160 is mounted on the door jamb for the left hand door 12 and it will be understood that switch 152 is likewise mounted on the door jamb for the right hand door 14. When the left hand door is closed, switch armatures 158 and 159 are normally closed to contacts 162 and 163. Contact 162 is electrically connected with contact 164 of the horizontal limit switch 98 and contact 166 of the horizontal limit switch 100, while contact 163 is electrically connected with contact 168 of the vertical limit switch 128 and contact 170 of the vertical limit switch 130. Switch 100 is connected to ground across the rearward field winding and armature of the reversible horizontal seat motor 174 and switch 98 is connected to ground across the forward field winding and armature of the motor 174. Switch 128 is connected to ground across the upward field winding and armature of the reversible vertical seat motor 180 and switch 130 is connected to ground across the downward field winding and armature of motor 180.

The armatures 150 and 151 of the jamb switch 152 are closed to contacts 184 and 185, respectively, when the right hand door is opened, and armatures 158 and 159 of jamb switch 160 are closed to contacts 186 and 187, respectively, when the left hand door is opened. Contacts 184 and 186 are connected to ground through the rearward field winding and armature of motor 174 across a normally closed horizontal rear limit switch 188. As shown in Figure 2 of the drawings, switch 188 is mounted on bracket 30 and is opened by means of a lug 190 on track member 26 when the seat moves to its horizontal rearward limit position. Contacts 185 and 187 are connected to ground across a normally closed vertically downward limit switch 192 and the downward field winding and armature of motor 180. As shown in Figure 2 of the drawings, switch 192 is mounted on support 40 and is opened by engagement with the support 30. The circuit diagram of Figure 4 is shown when both front doors are closed and the seat is at a horizontal position forward of its horizontal rear limit position and a vertical position above its vertical downward limit position, the pointers 144 of knobs 60 and 64 being set at 3 and 8 respectively.

Assuming now that both doors are closed and the driver desires to move the seat horizontally forward. The driver will grasp the knob 64 and turn the knob clockwise as viewed in Figures 2 and 3, to the number 7, for example. This will rotate shaft 62 in the same direction and gear 68 will then rotate the sector plate 92 in a counterclockwise direction relative to arm 72 so that the roller 106 of the horizontal limit switch 98 will ride from cam 88 on to cam 86 to thereby close the switch. Meanwhile, the roller 106 of limit switch 100 will move along cam 90 and the switch will remain open. As can be seen from Figure 4 of the drawings, when switch 98 is closed to contact 164, a circuit will be completed from the battery 154 to ground across the forward field winding and armature of motor 174 across switch armatures 150 and 158. Thus the motor will be energized to move the seat forwardly. As the seat moves forwardly, the stud 78 will react against slot 80 to swing arm 72 in a counterclockwise direction about shaft 70 so that cam 86 will move relative to the roller 106 of switch 98 until the roller moves from the cam 86 back to the cam 88 to open the switch at the set position 7 of the knob 64 on its corresponding dial. Thus the seat will move horizontally forwardly to the position corresponding to the No. 7 position marked on dial 146. During this horizontal movement of the seat, the pin 120 of lever arm 114 will move within the slot 122, and since the slot corresponds to the horizontal path of movement of the seat, there will be no rotational movement of the arm 114 relative to the shaft 70 so that switches 128 and 130 will remain open.

Figure 3:
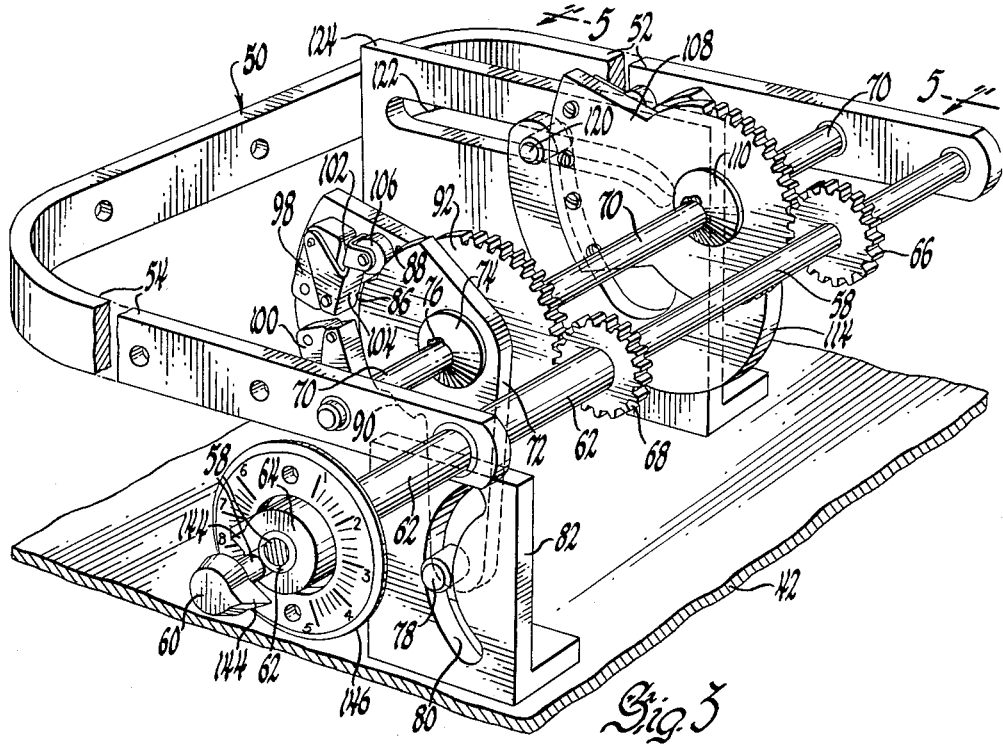
Figure 3 is a perspective view of the control unit of the seat positioning mechanism.

It can be seen that movement of the knob 64 counterclockwise, as viewed in Figures 2 and 3, so as to move the pointer 144 from its set position 8 to the position 9, for example, will result in horizontal rearward movement of the seat since the sector plate 92 will be rotated clockwise about shaft 70 to cause the roller 106 of switch 100 to move from cam 90 to cam 86 to close this switch and energize the rearward field winding of the motor 174 from the battery across the switch armatures 150 and 158. As the seat moves rearwardly, the engagement of the pin 78 within the slot 80 will swing the lever arm 72 clockwise about the shaft 70 so that cam 86 will move relative to the roller 106 of switch 100 until the roller moves on to cam 90 to open the switch when the seat reaches its set position 9.

Figure 5:
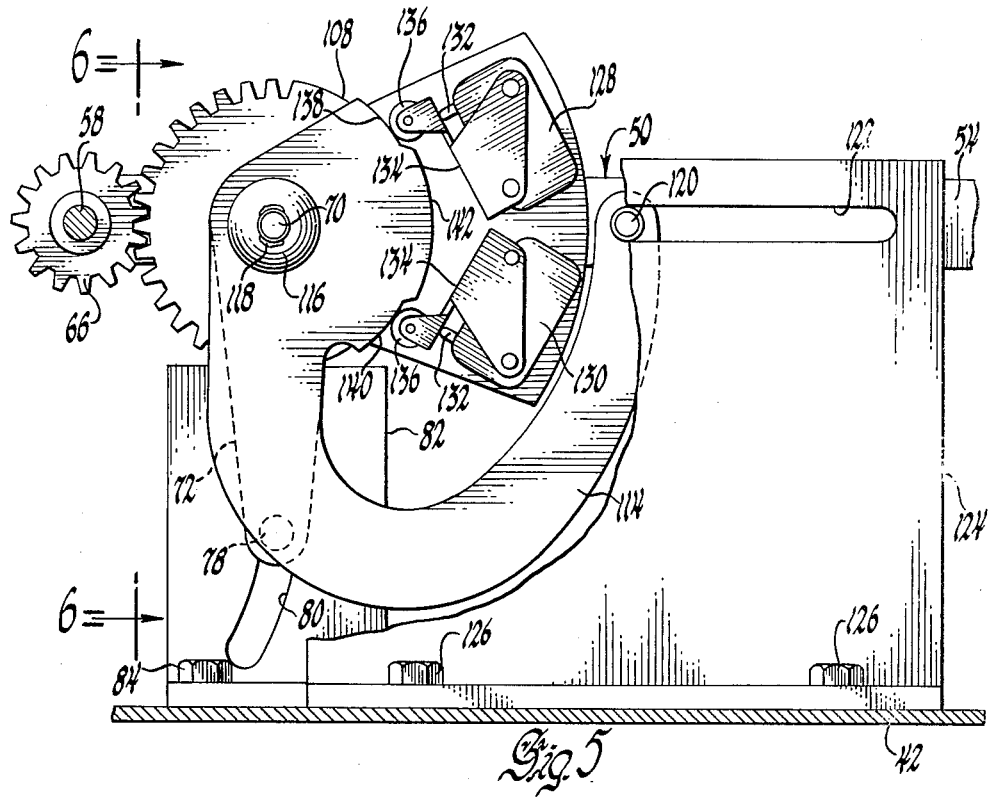
Figure 5 is a view, partially broken away, taken along the plane indicated by line 5—5 of Figure 3.
Figure 6:
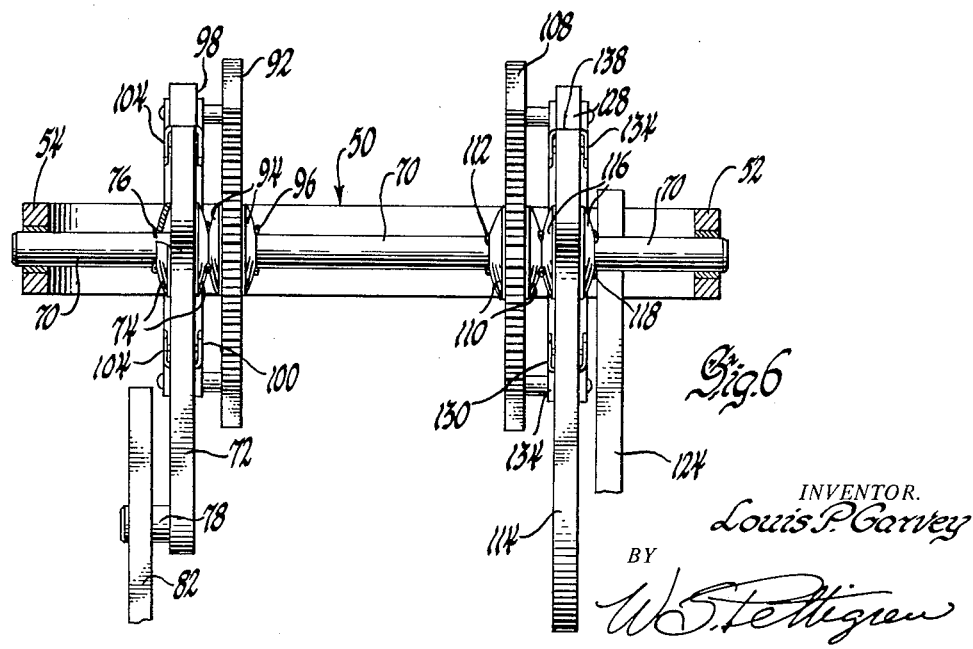
Figure 6 is a view, partially broken away, taken along the plane indicated by line 6—6 of Figure 5.

Assuming now that the driver desires to adjust the seat vertically upwardly. He will grasp the knob 60 and move the knob from its position, No. 3 on dial 146, to position 4, for example. This movement will rotate shaft 58 and gear 66 in a clockwise direction, as viewed in Figure 3, to rotate the sector plate 108 in a counterclockwise direction, as viewed in Figure 3, relative to the shaft 70 and arm 114. As can be seen in Figure 5 of the drawings, when the sector plate rotates in this direction, the roller 136 of switch 128 will move from cam 138 on to cam 142 to close the switch while roller 136 of switch 130 will move along cam 140 so that switch 130 remains open. Referring now to Figure 4 of the drawings, when switch 128 is closed to contact 168, a circuit is completed from battery 154 to ground across the upward field winding and armature of motor 180 through switch armatures 151 and 159. Thus motor 180 will be energized to move the seat vertically upwardly. As the seat moves vertically upwardly, the engagement of pin 120 within slot 122 will swing the arm 114 clockwise relative to the shaft 70, as viewed in Figure 5, so that the roller 136 of switch 128 will move from cam 142 to cam 138 to open the switch and thereby stop the seat motor when the seat has reached a vertically upward position corresponding to the position No. 4 marked on dial 146. Since the shape of slot 80 is arcuate and corresponds to the arc of swinging movement of the yokes 32, there will be no movement of the lever arm 72 relative to the shaft 70 so that switches 98 and 100 remain open.

Vertically downward movement of the seat can be accomplished in the same manner by turning the knob 60 counterclockwise, as viewed in Figures 2 and 3, from the set position 3 to the position 2, for example. This will rotate shaft 58 and gear 66 in the same direction and rotate the sector plate 108 in a clockwise direction to move the roller 136 or switch 130 from cam 140 to cam 142 to close the switch, while switch 128 remains open. As can be seen from Figure 4, when switch 130 is closed to contact 170, a circuit is completed from the battery 154 through the switch armatures 151 and 159 to ground across the downward field winding and armature of the motor 180 to energize the motor and move the seat vertically downwardly. As the seat moves vertically downwardly, the arm 114 will move counterclockwise, as viewed in Figure 5, so that the roller 136 of switch 130 will move from cam 142 and on to cam 140 to open the switch and stop the seat motor 180 when the seat reaches its set position No. 2 marked on the dial 146.

Thus, it can be seen that whenever a driver has moved the seat to his desired seat position, he merely has to remember his horizontal and vertical combination of numbers, such as 8, 3 or 7, 1 etc., and set the pointers 144 of knobs 60 and 64 to this combination. Thus he can instantaneously select his desired seat position without continuous manipulation of a manual seat switch.

As previously mentioned, whenever either front door of the vehicle is opened, the seat will move to its horizontal rearward limit position and its vertically downward limit position. This will now be described and it will be assumed that the knobs 60 and 64 are set as Nos. 3 and 8, respectively. Assuming now that the left hand front door is opened, as shown in Figure 1 of the drawings. The switch armatures 158 and 159 of switch 160 will then become closed to contacts 186 and 187, respectively, while the switch armatures 150 and 151 of switch 152 remain closed to contacts 156 and 157, respectively. Closure of armature 158 to contact 186 completes a circuit to ground from battery 154 across switch armature 150, contact 156, armature 158, contact 186, the horizontal rear limit switch 188, and the rearward field winding and armature of motor 174. Thus the motor 174 will be energized to move the seat horizontally rearwardly. Likewise, a circuit will be completed from battery 154 across switch armature 151, contact 157 armature 159, contact 187 to ground across the normally closed vertical downward limit switch 192 and the downward field winding and armature of the vertical seat motor 180. Thus motors 174 and 180 will move the seat vertically downwardly and horizontally rearwardly. When the seat reaches its horizontal rearward limit position, lug 190 will engage switch 188 to open the switch and stop motor 174 and support 30 will engage switch 192 to open this switch and stop motor 180.

During horizontal rearward movement of the seat, the engagement of pin 78 with the slot 80 of bracket 82 will swing the lever arm 72 clockwise about the shaft 70, as viewed in Figure 3, so that the roller 106 of switch 100 will move along cam 90 and the switch will remain open. Also, the lever arm 114 will swing clockwise about the shaft 70, as viewed in Figure 3, so that the roller 136 of switch 128 will move from the cam 138 on to cam 142 to close this switch, while the roller 136 of switch 130 will move along cam 140 and remain normally open. As can be seen from the circuit diagram of Figure 4, neither motor 174 nor motor 180 can be energized across the limit switches 98 and 128 whenever the switch armatures 158 and 159 are open to the contacts 162 and 163. Thus the seat will remain in its horizontal rearward and vertical downward position as long as the left hand front door remains open.

Assuming now that the left hand front door is closed. This will move switch armatures 158 and 159 out of engagement with contacts 186 and 187, respectively, and into engagement with contacts 162 and 163, respectively. Since switches 98 and 128 are closed, as previously described, a circuit will be completed from the battery 154 across switch armature 150, contact 156, armature 158, contact 162, switch 98 and to ground across the forward field winding and armature of motor 174 to energize this motor to move the seat horizontally forwardly. Likewise, a circuit will be completed from battery 154 across armature 151, contact 157, armature 159, contact 163 across switch 128 and the upward field winding and armature of motor 180 to energize this motor to move the seat vertically upwardly. As the seat moves horizontally forwardly, arm 72 will be swung counterclockwise about the shaft 70, as viewed in Figure 3, so that the roller 106 of switch 98 will move from cam 86 on to cam 88 to open the switch and stop motor 174 as soon as the seat reaches its horizontal starting position, and likewise lever arm 114 will be swung clockwise about shaft 70, as viewed in Figure 5, so that the roller 136 of switch 128 will move from cam 142 on to cam 138 to open the switch and stop the motor 180 when the seat reaches its vertical initial starting position. Thus the seat will be returned to its initial starting position both with respect to horizontal and vertical seat positions.

If the right hand front door is opened rather than the left hand front door, the same circuit across the horizontal rear limit switch 188 and the vertical downward limit switch 190 will be completed from contacts 184 and 185 rather than contacts 186 and 187, and the same sequence of movement will take place.

As previously mentioned, it is possible for a driver to set a new seat position when either door is open and the seat is at its horizontal rearward and vertically downward limit positions, and to have the seat returned to this new seat position rather than to the initial starting position of the seat. It will be remembered from the previous discussion regarding movement of the seat to its horizontal rearward and vertically downward position when either door is opened, that the switch 98 is closed since the roller 106 is on cam 86, and that the switch 128 is closed since the roller 136 is on cam 142. Thus if the new driver grasps the knob 60 and moves the knob from its position No. 3, the initial starting position, to a new position No. 4 for example, shaft 58 will be rotated clockwise, as viewed in Figure 3, to turn pinion gear 66 and move the sector plate 108 counterclockwise about the shaft 70 so that the roller 136 of switch 128 will move further along cam 142 away from cam 138. Thus when the seat is thereafter returned vertically upwardly upon closing of the door or doors, the seat will continue to move vertically upwardly past its initial starting position No. 3 until it reaches position No. 4 since the roller 136 will not move off of cam 142 and on to cam 138 to open the switch 128 until the seat has reached this new vertically upward position. If the driver grasps the knob 64 and moves the pointer 144 thereof from the position No. 8, the initial starting position, to the position No. 7, for example, sector plate 92 will be rotated counterclockwise about shaft 70 so that the roller 106 of switch 98 will move further along cam 86 away from cam 88. Thereafter when the door is closed and the horizontally forward field winding of motor 174 is energized, the seat will move from its rear limit position to a position No. 7 which is forward of position No. 3, since roller 106 will not move from cam 86 on to cam 88 until the seat has reached this new forward position.

Thus this invention provides an improved vehicle seat positioning mechanism of the dial selector type which facilitates exit and entrance of the driver and seat passengers and allows a plurality of drivers to each elect his desired seat position without continuous manipulation of a manual seat switch. The mechanism of this invention further allows a driver to set whatever seat position he desires prior to entrance within the vehicle, when a door is in open position, and will move the seat to this new elected seat position upon entrance of the driver and closure of the vehicle door regardless of whether this new position is different than the previously selected initial starting position of the seat.

What is claimed is:

1. In a vehicle body having a vehicle seat movably mounted thereon, the combination comprising, power operated means for moving said seat between a selected position and an elected position, selectively energizable and deenergizable mechanically actuated control means for selectively energizing and deenergizing said power operated means, mechanical actuating means for selectively mechanically actuating said control means, said actuating means having a neutral position with respect to said control means corresponding to said selected seat position and an operative position with respect thereto corresponding to said elected seat position wherein said control means and said power operated means are energized to move said seat to said elected position, means mounting said control means and said actuating means on said body for movement relative to each other, means for moving said control means relative to said actuating means to position said actuating means in operative position with respect thereto and energize said control means, and means for moving said actuating means relative to said control means to said neutral position with respect thereto when said seat reaches said elected position to thereby deenergize said control means and said power operated means.

2. In a vehicle body having a vehicle seat movably mounted thereon, the combination comprising, power operated means for moving said seat between a selected position and an elected position, selectively energizable and deenergizable mechanically actuated control means for selectively energizing and deenergizing said power operated means, mechanical actuating means for selectively mechanically actuating said control means, said actuating means having a neutral position with respect to said control means corresponding to said selected seat position and an operative position with respect thereto corresponding to said elected seat position wherein said control means and said power operated means are energized to move said seat to said elected position, means mounting said control means and said actuating means on said body for movement relative to each other, manually operated means for moving said control means relative to said actuating means to position said actuating means in operative position with respect thereto and energize said control means, and means responsive to movement of said seat for moving said actuating means relative to said control means to said neutral position with respect thereto when said seat reaches said elected position to thereby deenergize said control means and said power operated means.

3. In a vehicle body having a vehicle seat movably mounted thereon, the combination comprising, power operated means for moving said seat between a selected position and an elected position, selectively energizable and deenergizable mechanically actuated control means for selectively energizing and deenergizing said power operated means, mechanical actuating means for selectively mechanically actuating said control means, said actuating means and control means being movable relative to each other over a range of adjustment corresponding to the range of said seat and determined by a neutral position of said actuating means with respect to said control means corresponding to said selected seat position wherein said control means is deenergized and an operative position with respect thereto corresponding to said elected seat position wherein said control means is energized to energize said power operated means, means mounting said control means and actuating means on said body for movement relative to each other, means for moving said control means relative to said actuating means to position said actuating means in operative position with respect thereto to determine the range of seat movement and energize said control means, and means for moving said actuating means relative to said control means to position said actuating means in neutral position with respect thereto when said seat moves to said elected position to thereby deenergize said control means and said power operated means.

4. In a vehicle body having a vehicle seat movably mounted thereon, the combination comprising, power operated means for moving said seat between a selected position and an elected position, selectively energizable and deenergizable mechanically actuated control means for selectively energizing and deenergizing said power operated means, mechanical actuating means for selectively mechanically actuating said control means, said actuating means and control means being movable relative to each other over a range of adjustment corresponding to the range of said seat and determined by a neutral position of said actuating means with respect to said control means corresponding to said selected seat position wherein said control means is deenergized and an operative position with respect thereto corresponding to said elected seat position wherein said control means is energized to energize said power operated means, means mounting said control means and actuating means on said body for movement relative to each other, manually operated means for moving said control means relative to said actuating means to position said actuating means in operative position with respect thereto to determine the range of seat movement and energize said control means, and means responsive to seat movement for moving said actuating means relative to said control means to a neutral position with respect thereto when said seat moves to said elected position to thereby deenergize said control means and said power operated means.

5. In a vehicle body having a vehicle seat movably mounted thereon, the combination comprising, power operated means for moving said seat between a selected position and an elected position, selectively energizable and deenergizable first and second mechanically actuated control means for selectively and alternately energizing and deenergizing said power operated means, mechanical actuating means for selectively and alternately mechanically actuating said first and second control means, said actuating means and first and second control means being movable relative to each other over a range of adjustment corresponding to the range of seat movement and determined by a neutral position of said actuating means with respect to both said control means corresponding to said selected seat position wherein said first and second control means are deenergized and an operative position with respect to one of said control means corresponding to said elected seat position wherein said one control means is energized to energize power operated means, means mounting said first and second control means and said actuating means on said body for movement relative to each other, means for moving said first and second control means relative to said actuating means to position said actuating means in operative position with respect to one of said control means to determine the range of seat movement and energize said one control means and means for moving said actuating means relative to said first and second control means to a neutral position with respect to said one control means when said seat moves to said elected position to thereby deenergize said one control means and said power operated means.

6. In a vehicle body having a vehicle seat movably mounted thereon, the combination comprising, power operated means for moving said seat between a selected position and a predetermined limit position, selectively energizable and deenergizable first control means for respectively energizing and deenergizing said power operated means to move said seat from said selected position to said predetermined limit position, second mechanically actuated control means selectively and alternately energizable and deenergizable with said first control means for respectively energizing and deenergizing said power operated means to move said seat from said predetermined limit position to said selected position, mechanical actuating means for selectively mechanically actuating said second control means, said actuating means having a neutral position with respect to said second control means corresponding to said selected seat position wherein said second control means is deenergized and an operative position with respect thereto corresponding to said predetermined limit position wherein said second control means is energized, means responsive to movement of said seat from said selected to said predetermined position by said first control means for moving said actuating means to said operative position with respect to said second control means, said second control means being energized upon deenergization of said first control means when said seat is in said predetermined limit position to energize said power operated means to move said seat to said selected position, and means responsive to movement of said seat from said predetermined limit position to said selected seat position for moving said actuating means to said neutral position with respect to said second control means to deenergize said second control means when said seat reaches said selected position.

7. In a vehicle body having a vehicle seat movably mounted thereon, the combination comprising, power operated means for moving said seat over a range of movement between a selected position and a predetermined limit position, first selectively energizable and deenergizable mechanically actuated control means for respectively energizing and deenergizing said power operated means to move said seat from said selected position to said predetermined limit position, second mechanically actuated control means selectively and alternately energizable and deenergizable with said first control means for respectively energizing and deenergizing said power operated means to move said seat from said predetermined limit position to said selected position, mechanical actuating means for selectively mechanically actuating said second control means, said actuating means being movable relative to said second control means over a range of adjustment corresponding to the range of movement of said seat and determined by a neutral position of said actuating means with respect to said second control means corresponding to said selected position wherein said second control means is deenergized and an operative position with respect thereto corresponding to said predetermined position wherein said second control means is energized, means responsive to movement of said seat between said selected and said predetermined positions for moving said actuating means between said operative and said neutral positions with respect to said second control means, said second control means being energized upon deenergization of said first control means when said seat is in said predetermined limit position to energize said power operated means to move said seat to said selected position, and means responsive to movement of said seat for moving said actuating means to said neutral position with respect to said second control means to deenergize said second control means when said seat reaches said selected position.

8. In a vehicle body having a vehicle seat movably mounted thereon, the combination comprising, power operated means for moving said seat in one direction between a selected position and an elected position and in an opposite direction from said selected position to another elected position, selectively energizable and deenergizable mechanically actuated first control means for respectively energizing and deenergizing said power operated means to move said seat from said selected position to one of said elected positions, selectively energizable and deenergizable mechanically actuated second control means for respectively energizing and deenergizing said power operated means to move said seat from said selected position to the other of said elected positions, mechanical actuating means having a neutral position with respect to said first and second control means corresponding to said selected seat position and an operative position with respect to one of said control means corresponding to the elected seat position respective thereto to mechanically actuate said one control means and said power operated means, means mounting said first and second control means on said body for movement as a unit relative to said actuating means to position said actuating means in operative position with respect to said one of said control means and energize said one of said control means and said power operated means, and means for moving said actuating means relative to said one of said control means to said neutral position with respect thereto when said seat reaches said elected position respective thereto to deenergize said one of said control means and said power-operated means.

References Cited in the file of this patent

UNITED STATES PATENTS

| | | |
|---|---|---|
| 2,717,344 | Jackson | Sept. 6, 1955 |
| 2,720,619 | James | Oct. 11, 1955 |
| 2,823,949 | Williams et al. | Feb. 18, 1958 |
| 2,827,105 | Brundage | Mar. 18, 1958 |